United States Patent [19]
Berg et al.

[11] Patent Number: 5,986,852
[45] Date of Patent: Nov. 16, 1999

[54] HIGH CAPACITY, HIGH PERFORMANCE LOW PROFILE DISK DRIVE

[75] Inventors: Lowell James Berg; William Woodrow Brooks, Jr., both of Rochester; Jerome Thomas Coffey, Oronoco; Daniel Lee Good; Richard Greenberg, both of Rochester; Peter Maurice Herman, Oronoco; John Charles Jans, Sr.; Kenneth William Meyer, both of Rochester; Jerry Lee Neubauer, Stewartville; John Ralph Reidenbach, Rochester; Steven Harry Voss, Rochester; Donald John Wanek, Rochester; Walter Ervin Zahn, Oronoco, all of Minn.

[73] Assignee: International Business Machines Corporation, Armonk, N.Y.

[21] Appl. No.: 07/963,440

[22] Filed: Oct. 19, 1992

[51] Int. Cl.⁶ ................................ G11B 5/54; G11B 33/00
[52] U.S. Cl. ...................... 360/104; 360/106; 360/97.01
[58] Field of Search ...................................... 360/106, 105, 360/97.02, 97.03, 98.01

[56] References Cited

U.S. PATENT DOCUMENTS

| | | | |
|---|---|---|---|
| 3,587,073 | 6/1971 | Ghose et al. | 340/174.1 |
| 4,150,407 | 4/1979 | Dijkstra | 360/106 |
| 4,196,456 | 4/1980 | Manzke et al. | 360/106 |
| 4,713,704 | 12/1987 | Voll et al. | 360/97 |
| 4,764,829 | 8/1988 | Makino | 360/106 |

(List continued on next page.)

FOREIGN PATENT DOCUMENTS

| | | |
|---|---|---|
| 34 12 231 | 10/1985 | Germany . |
| 60-43289 | 3/1985 | Japan . |
| 60-89875 | 5/1985 | Japan . |
| 63-859 | 1/1988 | Japan . |
| 63-206954 | 8/1988 | Japan . |
| 03016069 | 1/1991 | Japan . |
| 03122879 | 5/1991 | Japan . |
| 03201281 | 9/1991 | Japan . |
| WO91/19288 | 12/1991 | WIPO . |

OTHER PUBLICATIONS

Dunman et al., "Actuator Assembly for a Disk File," *IBM Technical Disclosure Bulletin*, vol. 20, No. 5, Oct. 1977, pp. 1984–1985.

Glaser et al., "Electrically Plugable HSA–to–Actuator Configuration," *Research Disclosure*, Jul. 1989, No. 303

Jones, K. C., "Flexible Cable/Coil Assembly for a Floppy Disk Drive head Access Arm," *IBM Technical Disclousure Bulletin*, vol. 26, No. 12, May 1984, pp. 6255–6256.

Luoma, P. W., "Coil Lead Termination System for Magnetic Head Assemblies," *IBM Technical Disclosure Bulletin*, vol. 19, No. 4, Sep. 1976, pp. 1377–1379.

May, G. H., "Two–Stage Disk File Actuator," *IBM Technical Disclosure Bulletin*, vol. 26, No. 2, Jul. 1983, pp. 846–849.

(List continued on next page.)

*Primary Examiner*—Jefferson Evans
*Attorney, Agent, or Firm*—Joan Pennington

[57] ABSTRACT

A low profile, high capacity, high performance disk drive includes a plurality of disk surfaces mounted in parallel for simultaneous rotation about an axis. Each of a plurality of data transducer heads for reading and/or writing data to the data surfaces is attached to a slider. A stacked arm actuator for moving the data transducer heads in a radial direction across the disk surfaces includes a supporting arm and a suspension load beam attached to the supporting arm. The suspension load beam connects the supporting arm to the slider. The suspension load beam includes a load dimple bearing on the slider and has opposed stiffening flanges extending in a plane adjacent the slider. The actuator includes a stack of 9 head arm suspension assemblies and the stack has a height of 16.634 mm. An interdisk spacing of less than 1.4 mm provides a height dimension of 14.635 for a stack of 8 disks. Shock and electrical isolation is accomplished using four mounting blocks carrying energy absorbing, highly damped, resilient material.

24 Claims, 7 Drawing Sheets

U.S. PATENT DOCUMENTS

| | | | |
|---|---|---|---|
| 4,772,972 | 9/1988 | Maeda | 360/97 |
| 4,772,974 | 9/1988 | Moon et al. | 360/98 |
| 4,805,055 | 2/1989 | Wright | 360/106 |
| 4,831,476 | 5/1989 | Branc et al. | 360/97.02 |
| 4,875,117 | 10/1989 | Slezak et al. | 360/98.01 |
| 4,887,179 | 12/1989 | Coe | 360/135 |
| 4,912,583 | 3/1990 | Hinlein | 360/104 |
| 4,996,623 | 2/1991 | Erpelding et al. | 360/104 |
| 4,999,724 | 3/1991 | McAllistar et al. | 360/97.03 |
| 5,006,946 | 4/1991 | Matsuzaki | 360/104 |
| 5,012,368 | 4/1991 | Bosier et al. | 360/104 |
| 5,014,142 | 5/1991 | Nakanishi et al. | 360/98.01 |
| 5,014,145 | 5/1991 | Hosokawa et al. | 360/104 |
| 5,027,241 | 6/1991 | Hatch et al. | 360/105 |
| 5,027,242 | 6/1991 | Nishida et al. | 360/106 |
| 5,029,027 | 7/1991 | Sleger | 360/97.03 |
| 5,041,932 | 8/1991 | Hamilton | 360/104 |
| 5,041,935 | 8/1991 | Aruga et al. | 360/106 |
| 5,045,738 | 9/1991 | Hishida et al. | 310/90 |
| 5,050,026 | 9/1991 | Goss | 360/106 |
| 5,055,969 | 10/1991 | Putnam | 361/398 |
| 5,121,296 | 6/1992 | Hsu | 361/395 |
| 5,184,265 | 2/1993 | Foote et al. | 360/97.02 |
| 5,187,625 | 2/1993 | Blaeser et al. | 360/105 |

OTHER PUBLICATIONS

Reidenbach, J. R., "Combination Suspension–Lead Cable for a Multi–Gap Read/Write Head," *IBM Technical Discloure Bulletin,* vol. 22, No. 4, Sep. 1979, pp. 1602–1603.

Watrous, R. B., "Magnetic Head Suspension Assembly," *IBM Technical Disclosure Bulletin,* vol. 24, No. 10, Mar. 1982, p. 4915.

Reidenbach, J. R., "Integral Spindle Assembly," *Research Disclosure,* Apr. 1991, No. 324.

IBM Technical Disclosure Bulletin, v. 17, No. 8, Jan. 1975, A.W. Orlando, "Pressurized Disc Pack", pp. 2367–2368.

IBM Technical Disclosure Bulletin, v. 28, No. 6, Nov. 1985, Anonymous, "Suspension to Arm Attachment with Ramp Plate Structure . . . ", p. 2492.

*1992 Disk/Trend Report*–Rigid Disk Drives, p. SUM–44.

ID = 11.3mm
YIELD = 1620 MPa
MODULUS = 210 GPa
THICKNESS = 1mm

FIG. 20

HIGH CAPACITY, HIGH PERFORMANCE LOW PROFILE DISK DRIVE

BACKGROUND OF THE INVENTION

1. Field of the Invention

The present invention relates to disk drive assemblies and, more particularly, to a high capacity, high performance two and one-half inch diameter, low profile disk drive.

2. Description of the Prior Art

Common form factors for hard disk drives are becoming smaller and smaller. Over the years disk diameters have been incrementally reduced from 24" to 14" to 10½" to 8" to 5¼" to 3½" to 2½", 1.8" and recently a 1.3 inch disk drive was announced. Currently, 3½ and 2½ inch drives are in widespread use in low end systems, personal computers and lap top computers. To obtain as much data storage capacity in these small drives as practically possible, it is necessary to maximize the number of disks that can be fitted into a standard form factor. Consequently, the spacing between adjacent disks is becoming smaller also. Narrower disk spacings dictate that actuator arms must become thinner and that head/suspension assemblies (HSA's) take on a lower profile.

Figure 4:
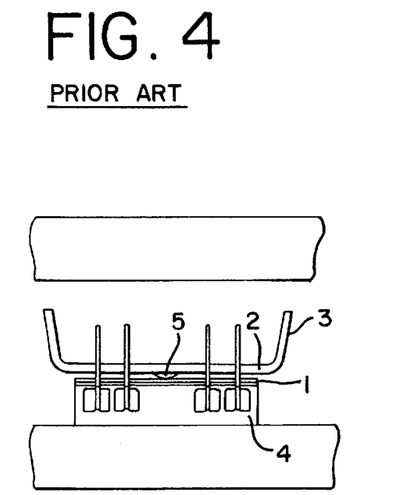
FIG. 4 is an end view schematically showing a prior art head/suspension arrangement.

FIG. 4 shows a conventional head/suspension assembly with a suspension having a flexure 1 and a load beam 2 carrying reinforcing features 3, or such as a separate folded part welded to the top portion of the load beam for reinforcement and load transmission which are solely on the top or away from a slider 4 positioned by the suspension. The load is transmitted from the load beam 2 through a more or less rigid dimple feature 5 which may be a part of the load beam, flexure, or even the slider. The flexure 1 is a thin metal member used to locate the slider 4 in the plane of the disk surface, while allowing the slider to pitch and roll to follow the contours of the disk surface, as well to compensate for the relative motion of the actuator with respect to the disk surface normal direction. The load beam 2 is another thin metal member which has some type of reinforcement to provide resilient spring action which biases the slider 4 toward the surface of the disk so that the slider will fly stably at the appropriate fly-height. The dimple 5 is used to transmit the relatively large slider load rather than transmitting the slider load through the very thin flexure.

An attachment mechanism, such as an arm or a mounting plate, attaches the suspension to the file actuator. The electrical connection between the transducers and the disk file read/write electronics is made by twisted pair wires which run the length of the suspension and extend over the flexure and slider. The ends of the wires are soldered or ultrasonically bonded to the transducer pads on the slider.

While a single HSA is shown, typically back-to-back HSA's are used for the adjacent disk surfaces. As can be seen from FIG. 4, the conventional design requires a very significant amount of disk-to-disk spacing to accommodate the upright reinforcing features of the prior art HSA design. Some conventional designs waste space by including angles between the load beam and the arm to which the load beam is attached.

Historically in small DASD's 5¼" and smaller, a disk drive enclosure for a head/disk assembly (HDA) is fitted into a metal frame commonly called a user frame. This user frame is typically an aluminum die casting or formed from a sheet metal stamping. Generally, a HDA is attached to the user frame via three or four resilient vibration isolators or shock mounts. For these isolators to be effective, space is required between the HDA and the user frame to allow the HDA to move freely in response to external vibration or shocks. Threaded holes are provided at standard locations in the right and left sides and the bottom of the user frame for attaching the disk drive assembly to the using system box. Therefore, the user frame becomes firmly mounted to the using system box, but the HDA is both electrically and mechanically isolated via the vibration/shock isolators. When magneto-resistive (MR) heads are used within a file, electrical isolation is required between the HDA and the user frame.

Known commercially available two and one-half inch hard disk drives are commonly classified as being low capacity and exhibiting relatively low performance. Typically these drives have one or two 65 mm disks and provided a storage capacity of 40 to 120 megabytes (MB). Latencies are in the range of 30 to 35 ms, average access times are greater than 15 ms, and data rates go from 1.5 to 4 MB/sec to/from the media. In most cases, to conserve space and to reduce costs, user frames and shock isolators are not used. Head/disk assemblies (HDA's) include an enclosure screwed directly to the user's box. HDA enclosures typically are simple die cast flat bases with die cast or stamped screwed on covers. These files are aimed at the low end applications, such as personal computers and lap top computers.

For example, the CONNERS CP20XX small 2½" disk drive series has dispensed with the use of mechanical isolators and the user frame and provide mounting holes directly into the HDA structure. This mounting scheme appears to be satisfactory for those small drives. Other known disk files use three or more stiff shock mounts between the HDA and using system box. Shock mounts that are very stiff are not generally effective for vibration isolation, but provide shock isolation.

Disk files for high end and mid-range applications require a very high capacity, very high performance file, advantageously packaged in a 1 inch high, 2½ inch form factor. As many disks and transducer heads as possible are put within the HDA enclosure to get maximum storage capacity. Very high volumetric density packaging is required to provide high capacity in the standard form factor. However, convention construction of current 2½ inch drives cannot achieve either a very high capacity or a very high performance file. A need exists to accomplish high volumetric density packaging, to provide a very high storage capacity, and a high performance disk file.

SUMMARY OF THE INVENTION

It is a principal object of the present invention to provide a very high capacity, very high performance disk drive unit, packaged in a 1 inch high, 2½ inch form factor. Other important objects of the invention are to provide a low profile, high capacity and high performance disk drive; to provide such a low profile disk drive having head/suspension assemblies arranged to minimize required inter-disk spacing and merge height requirements; to provide such a low profile disk drive substantially without negative effects and that overcomes many of the disadvantages of prior art arrangements.

In brief, the objects and advantages of the present invention are achieved by a low profile, high capacity, high performance disk drive including a plurality of disk surfaces mounted in parallel for simultaneous rotation about an axis. Each of a plurality of data transducer heads for reading and/or writing data to the data surfaces is attached to a slider.

A stacked arm actuator for moving the data transducer heads in a radial direction across the disk surfaces includes a supporting arm and a suspension load beam attached to the supporting arm. The suspension load beam connects the supporting arm to the slider. The suspension load beam includes a load dimple bearing on the slider and has opposed stiffening flanges extending in a plane adjacent the slider. The actuator includes a stack of 9 head/arm suspension assemblies and the stack has a height of 16.634 mm. An interdisk spacing of less than 1.4 mm provides a height dimension of 14.635 for a stack of 8 disks.

BRIEF DESCRIPTION OF THE DRAWING

The present invention together with the above and other objects and advantages can best be understood from the following detailed description of the embodiment of the invention illustrated in the drawing, wherein.

DETAILED DESCRIPTION OF THE PREFERRED EMBODIMENTS

Figures 1, 2:
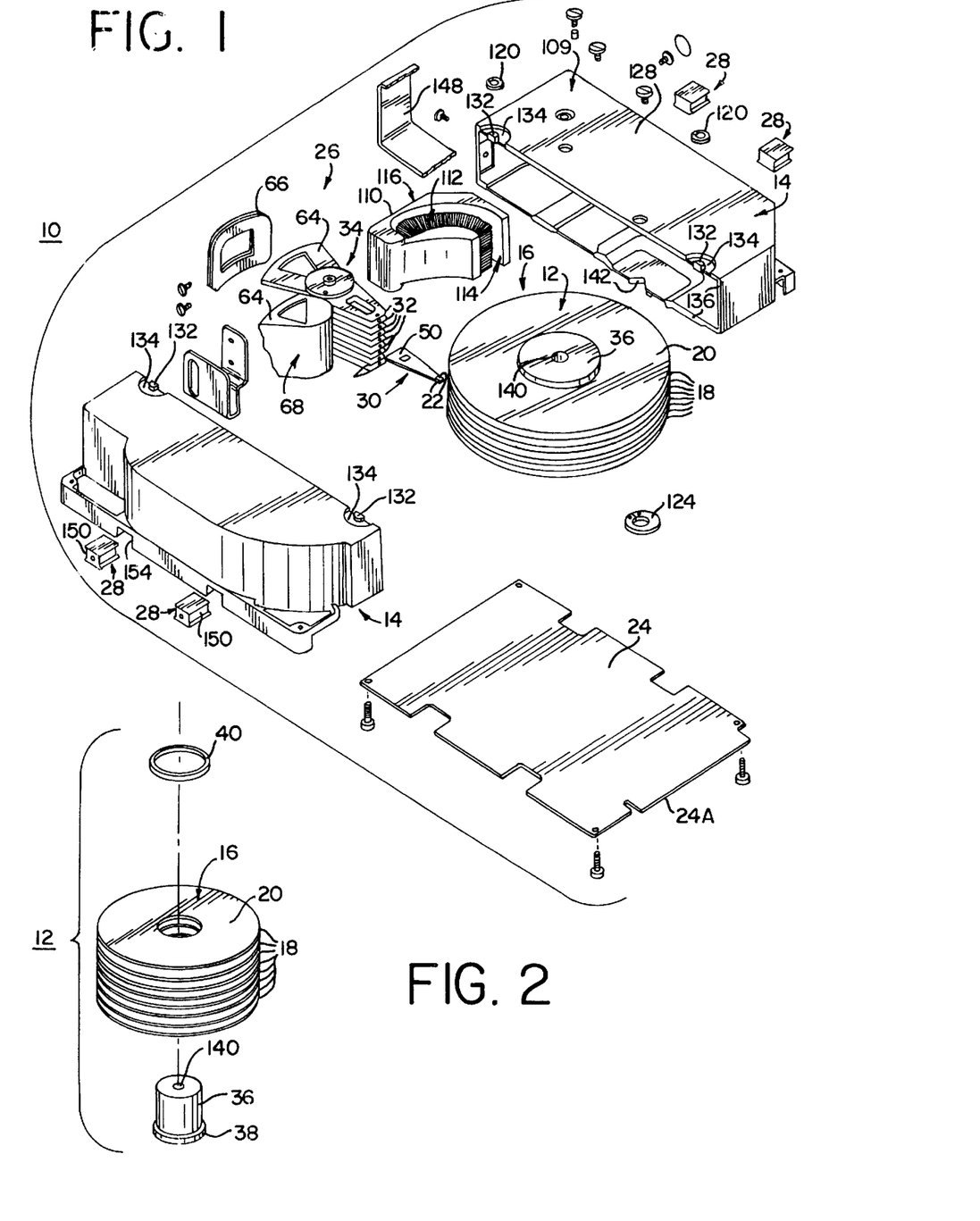
FIG. 1 is an exploded perspective view of a high capacity, high performance two and one-half inch diameter, low profile disk drive of the invention.
FIG. 2 is an exploded perspective view of a spindle assembly of the low profile disk drive of FIG. 1.

Referring now to FIG. 1 of the drawing, there is shown an exploded perspective view of a low profile disk drive unit designated as a whole by the reference character 10 and constructed in accordance with principles of the present invention. Disk drive 10 is a 1 inch high, 2½ inch form factor unit. Features of disk drive 10 include a very high capacity and high performance. For example, disk drive 10 is configured to store data at a recording density of 565 MB/square inch at 133K bits/inch and 4250 tracks/inch. A unique integrated motor and spindle assembly designated as 12 mounted into a structurally stiff clam shell enclosure designated as 14 facilitates this recording density. A stack 16 of eight disks 18 providing sixteen recording surfaces 20, sixteen transducers or heads 22, and a bottom mounted electronics planar card 24 are packaged in the 1 inch high enclosure 14. The resulting storage capacity is 2 GB. A spindle speed of 8500 rpm translates into a latency of 3.5 ms and a data rate of about 9 MB/sec. An actuator assembly generally designated as 26 is designed to provide an average non-zero access time of less than 7 ms. Shock isolation is provided by an electrical and mechanical shock isolation arrangement designated as 28 eliminating the need for both commercial shock absorbers and a user frame.

To package the eight disks 18, the sixteen recording heads 22, and the electronics planar card 24 all in the 1-inch high disk drive 10 requires very narrow disk spacings and a plurality of very low profile head/suspension assemblies (HSA's) generally designated as 30. Conventional back-to-back HSA's will not fit within a narrow interdisk or disk-to-disk spacing, such as an interdisk spacing of 1.365 mm of the disk drive 10. One end of the low profile HSA 30 is bonded to an actuator arm 32. An actuator stack 34 includes nine actuator arms 32 that are individually replaceable, stacked units with an integral spacer feature.

Low profile modules having a maximum mounted height of less than 2 mm are mounted to the single electronics planar card 24 using state-of-the-art packaging, such as, for example, thin quad flat packs (TQFP) and direct chip attach (DCA) methods. There is also a limited amount of room available for mounting components that cannot meet the 2 mm height restriction which includes filter capacitors and crystal oscillators. These components (not shown) are mounted on the backside or top side of the planar card 24 and extend into recesses or openings provided in the HDA enclosure 14. The planar card 24 is made from 0.8 mm thick FR4 stock containing four signal and two power planes. The thickness of the planar card 24 is controlled to allow the use of a 68 pin PC style card edge connector 24A.

FIG. 2 provides an exploded view of the spindle assembly 12. An integral bearing spindle is used for enabling very high density recording. A rotating hub 36 provides sufficient internal motor space for a required motor large enough to spin eight disks at 8500 rpm. Spindle assembly 12 contains eight 0.635 mm thick, 65 mm diameter disks 18 that are spaced 1.365 mm apart. A resulting disk stack height is 14.635 mm. Disks 18 can include either a ceramic substrate, such as, for example, a ceramic material sold under the trademark Canasite by Kyocera of Japan or an aluminum substrate.

Spindle hub 36 includes a flange 38 located at the bottom of the disk stack 16. The disks 18 are stacked on the flange 38 and a clamping ring 40 is mounted on the opposite end of the spindle hub 36. Spindle shaft retainers for clamping at both ends of the spindle are illustrated and described with respect to FIGS. 13–16.

An alternate spindle configuration (not shown) with a flange located in the center of the disk stack rather than at one end of the hub could be used. A centrally located flange in effect divides the disk stack 16 into two 4-disk stacks so that the required stack clamping force is reduced.

Figure 3:
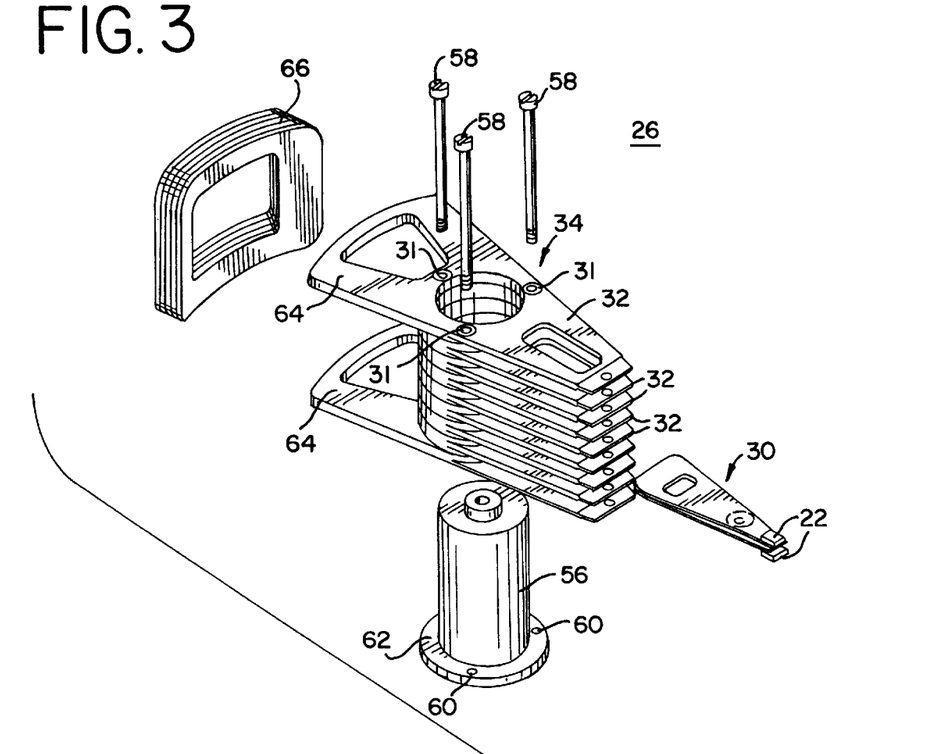
FIG. 3 is an exploded perspective view of a stacked comb assembly of the disk drive of FIG. 1.
Figures 6, 7:
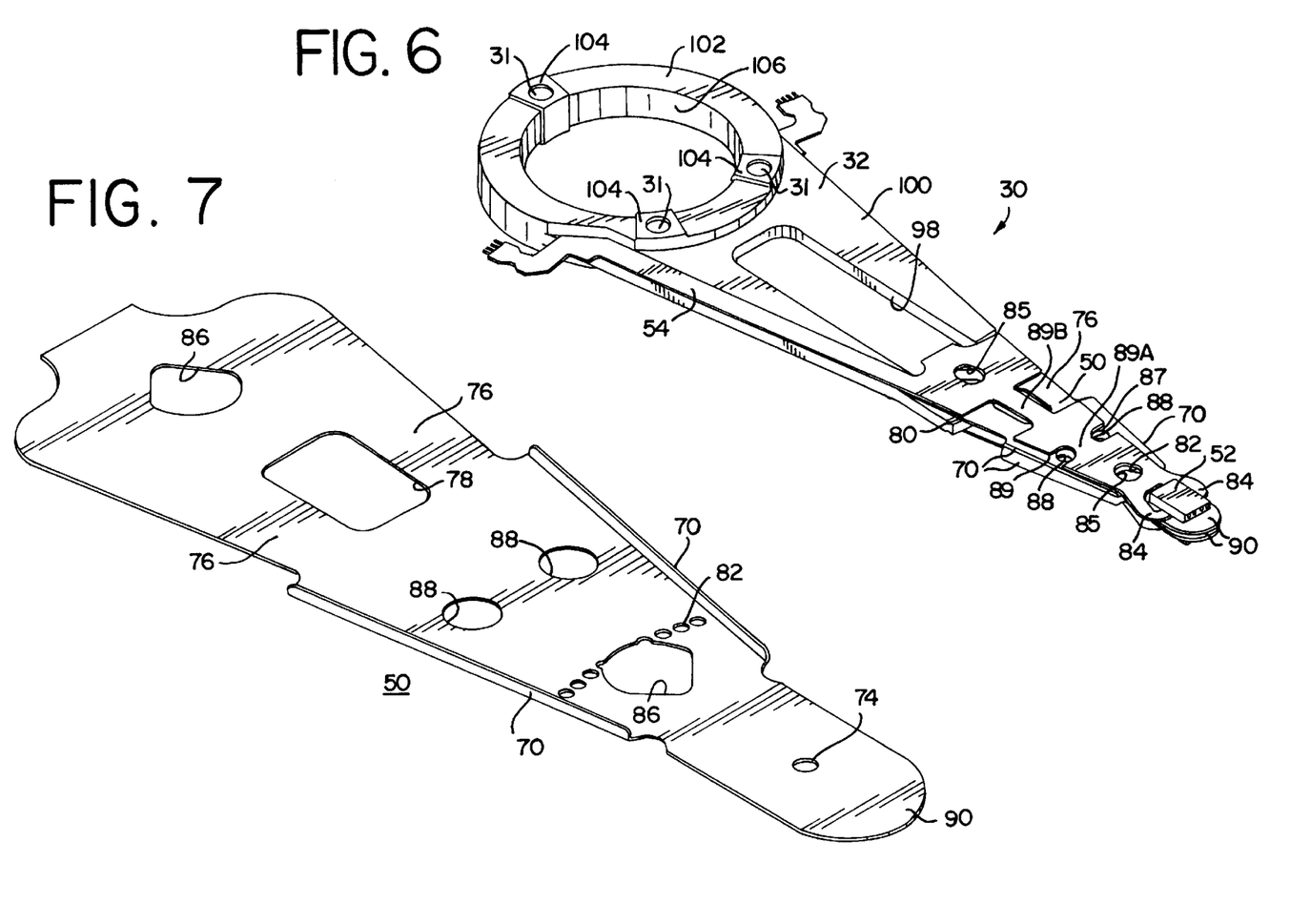
FIG. 6 is a perspective view of a preferred head/arm assembly of the low profile disk drive of FIG. 1.
FIG. 7 is an enlarged perspective view of a suspension load beam of the head/arm assembly of FIG. 6.
Figures 8, 9, 10:
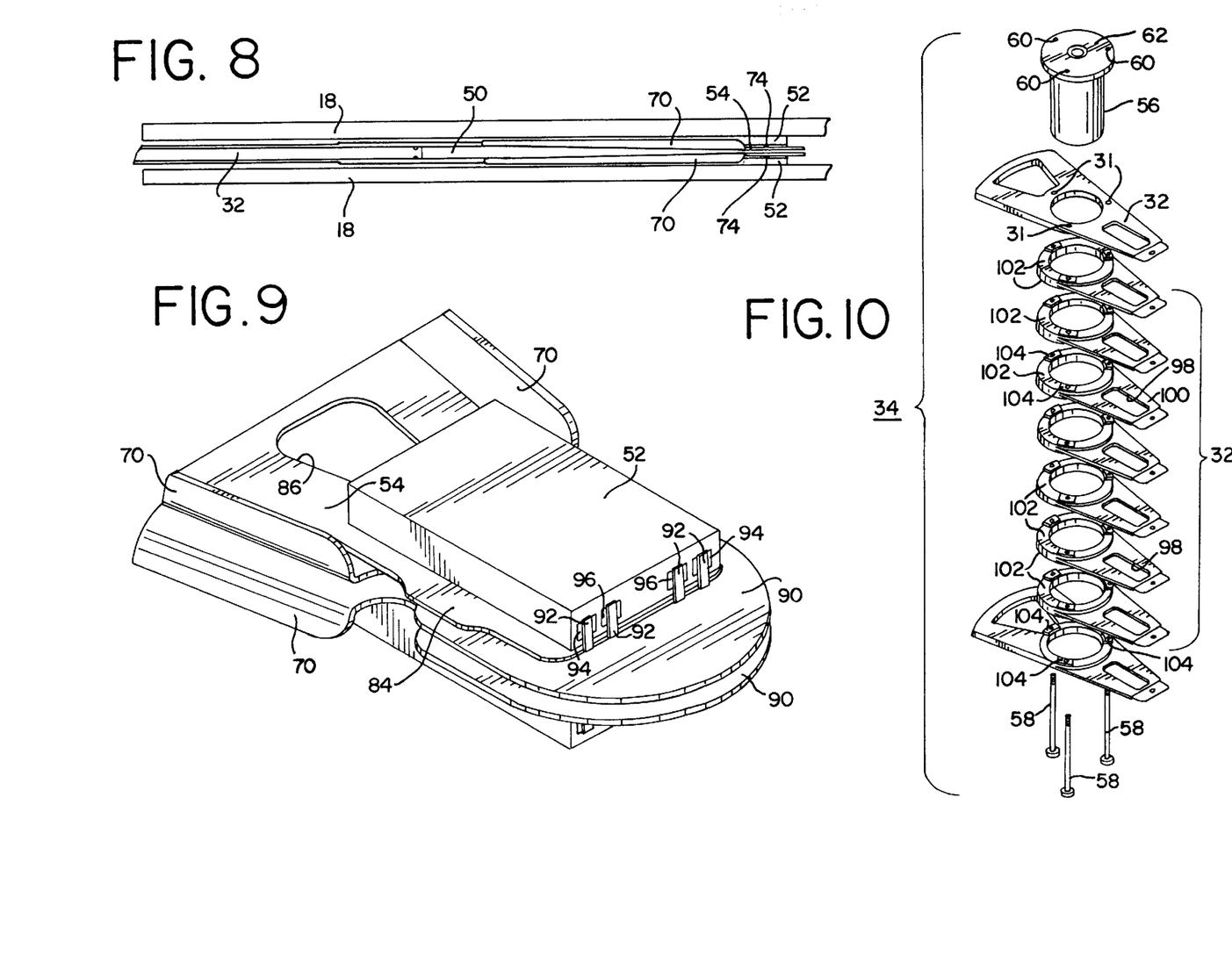
FIG. 8 is a fragmentary side view of the head/arm assembly of FIG. 6 together with associated disks.
FIG. 9 is a fragmentary perspective view illustrating head termination of the head/arm assembly of FIG. 6.
FIG. 10 is an exploded perspective view of the stacked arm comb assembly of the low profile disk drive of FIG. 1.

FIGS. 3 and 10 illustrate the actuator stack 34 of actuator assembly 26. Referring also to FIG. 6, the low profile HSA 30 includes a single suspension load beam 50 carrying a slider 52 and an associated flat flexible lead cable or flexible cable interconnect 54 bonded directly onto an associated arm 32. The individual stackable arms 32 are necessary to facilitate HSA to arm fabrication and actuator repair or rework requiring HSA replacement. The complex flexible cable configuration of cable 54 is best seen in FIG. 6. Individual arm assemblies are stacked onto a flanged bearing cartridge 56. Three long screws 58 received through aligned apertures 31 in the arms 32 and threadingly received within aligned apertures 60 in a cartridge flange 62 to clamp the arm stack to the cartridge flange.

A top and bottom ones of the arms 32 include a rearward extension 64 providing for attachment of a curved vertical coil 66 of a voice coil motor (VCM) to the stacked arm, comb assembly 34. Because the actuator stack 34 is short, 16.634 mm, and sixty-four HSA cable lead connections are required, the dynamic flexible cable generally designated as 68 in FIG. 1 wraps around the back side of the assembly 26 to present connecting pads to both sides of the stacked arm, comb assembly 34.

Figure 5:
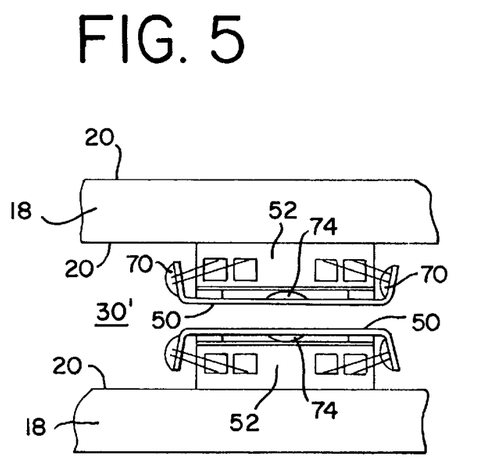
FIG. 5 is an end view schematically showing a first embodiment of a head/suspension assembly of the invention.

In FIG. 5 there is shown schematically an end-on view of a HSA generally designated as 30' of the invention. A feature of the invention is that wasted height as compared with a conventional prior art design is eliminated. A pair of reinforcing flanges generally designated as 70 are provided adjacent the slider 52. only the height of a dimple 74 formed on the suspension load beam 50 that directly engages the slider 52, the thickness of a load beam 50 and the thickness of the slider 52 need fit between the disk surfaces 20. Thickness of flexure is eliminated from the space required by configuring the flexure so that the dimple 74 bears directly on the slider 52.

In HSA 30', two pairs of head leads are bonded to the load beam routed along either the inside or the outside of the reinforcing load beam flange 70, whichever is best for manufacturing purposes. The HSA design 30' requires assembly by hand because automated wire stringing would not be possible. Also, twisted pair wires are typically used to provide noise shielding, with one twisted pair connected to the read element leads and the other twisted pair connected to the write element leads.

FIG. 6 provides a perspective view of the preferred low profile HSA 30 and the actuator arm 32 of the actuator assembly 26 of the disk drive 10. FIG. 6 shows the low profile HSA 30 and its associated flexible cable interconnect 54 permanently bonded to the top side of the individual actuator arm 32. An identical HSA, except for slider rail geometry, is bonded to the bottom side of the same arm. Connections of the lead cables to the dynamic flexible cable 68 are made at both sides of the actuator assembly 26.

Referring also to FIGS. 7, 8 and 9, a pair of the single piece head suspension load beams 50 are bonded to the top and bottom sides of the center arms 32. Each head suspension load beam 50 carries a slider 52 and includes the dimple 74 for direct engagement with the slider 52. The suspension load beam 50 forms the reverse reinforcing or stiffening flanges 70 disposed adjacent the slider 52 to minimize merge height requirements. Direct bonding of the load beam 50 to the arm 32 enables the minimum disk spacing requirement at the arm or actuator end of the assembly. A HSA 30 including a small slider positioning MR transducers is installed between adjacent disks 18 with the interdisk spacing 1.365 mm spacing as shown in FIG. 8.

Formed areas generally designated as 76 adjacent an aperture 78 of the load beam provide a gram load feature of the load beam 50. Bonding of the load beam 50 to the outer surface of the arm 32 with clearance between the two load beams on each arm allows for controllable gram load adjustment through mechanical or thermal means after head/arm assembly. The capability for controllable gram load adjustment at arm level is absolutely essential to be able to deliver very tight gram load control required for very tight flyheight control.

Using adhesives to bond the layers 50 and 54 of the HSA 30 together complements an automatic assembly process. Referring to FIGS. 6 and 7, glue dams on the arm 32 and the load beam 50 generally designated as 80 and 82, respectively, control some of the adhesive boundaries and provide fixed known boundary conditions for the load beam 50 and a pair of flexure portions or flexure elements 84 of the flexible cable 54 without requiring unusual requirements for adhesive application. Glue dams are simply provided by machining or forming the slight grooves 80 in the arm 32 and in the load beam 50 by etching or punching small holes or slits 82. In both the arm 32 and the load beam 50, the glue dams 80 and 82 divert the adhesive from advancing by allowing it to flow into the dam feature or features.

Referring to FIG. 7, load beam 50 includes a pair of alignment apertures 86 and a pair of drainage apertures 88 to facilitate cleaning the assembled HSA 30. Referring also to FIG. 6, the flexible cable interconnect 54 includes a pair of corresponding, alignment apertures 85 with the beam apertures 86 and a pair of recessed portions 87 aligned with the drainage apertures 88. The opposed recessed portions or cutouts 87 provide a thin cable portion 89A between the drainage apertures 88. A second thin cable portion 89B is defined between the adjacent gram formed portions 76 of the load beam 50.

Load beam 50 has a merge nose extension 90 which allows for relatively simple actuator to file merge tooling despite the very small disk-to-slider tolerance during merge. As shown in FIG. 8, the dimple 74 extends through the flexure cable 54 bearing directly on the slider 52 to minimize assembly height and increase dimple sliding friction for reduced off-track relative slider motion during crashstop impacts, and to provide good conductivity between slider and actuator for reduced electrical noise on the read signal. Load beam 50 is either etched or stamped to shape and the flanges 70 and the dimple 74 are formed, for example, using a conventional 2-step progressive die.

Referring to FIG. 9, the flexible cable interconnect 54 is used instead of wires for electrical connection to the MR transducers of slider 52. One of two pairs of actuator flexible cable leads 92 are ultrasonically bonded to the slider MR write element transducers pads 94 and the other pair ultrasonically bonded to MR read element transducer pads 96. Elimination of wire stringing, twisting and dressing simplifies the assembly tooling and the manufacturing process for the actuator assembly 26. Also, the ultrasonically bonded lead/transducer pad assembly avoids the fatigue vuneraility of a standard terminated thin film head because relative motion of the head leads is eliminated. Noise protection is offered by the close proximity of the grounded load beam to the active lines in the flexible cable interconnect 54. Additional noise protection could be provided by grounded lines between the active lines, or even by the addition of a separate grounded conductor plane in the flexible cable interconnect 54.

Flexible cable 54 replaces a conventional separate metal flexure in providing the slider gimbaling function. This minimizes the required height and provides improved flying height (FH) tolerance control through lower pitch and roll stiffness rather than conventional metal flexure and lead wire designs. Elimination of the flexure and a mount plate reduces the overall cost of the HSA.

Referring to FIGS. 3, 6 and 10, the stacked arm, comb assembly 34 accommodates actuator reworkability when HSA's 30 need to be replaced and fabricates HSA's 30 to arms 32. Each of the arms 32 are individually insertable and removable relative to the actuator assembly 26. FIG. 10 is an exploded perspective view of the stacked arm, comb assembly 34. Two low profile HSA's are permanently attached to each center individual actuator arm 32. For simplicity, the HSA's 30 are omitted from FIG. 10. The comb assembly 34 has an overall height less than 18 mm as required for use with the enclosure 14 including seven identical center arms 32 and the top and bottom arms that are the same except for orientation in the stack. A rectangularly shaped opening 98 in a uniform thickness portion 100 of each arm 32 reduces mass and rotational inertia of each arm. A raised hub 102 on opposed sides of each center arm 32 affords symmetry and serves as an integral spacer ring. Due to space restrictions, the top and bottom arms 32 have a raised hub 102 only on one side that faces an adjacent center arm 32 in the stack of actuator arms. Each hub surface 102 is provided with three small pads 104 surrounding the arm apertures 31. Precision machining of the six pads 104 per arm 32 assures arm parallelism and minimum stackup tolerances, eliminating separate spacer rings of conventional arrangements. In addition, since three points determine a plane, and assuming the small pads 104 behave like points, the arms 32 are likely to undergo less distortion when clamped.

The preferred material for the arms 32 is aluminum because of its light weight, high stiffness to mass ratio, ease of machining, thermal stability, conductivity, plateability, and cost. Ceramic materials have even better stiffness to mass ratios and thermal stabilities; however, ceramic materials are not electrically conductive as required with arms 32 used with MR transducing heads and therefore, require plating. The use of ceramic arms results in higher part costs.

To assemble the stacked arm, comb assembly 34, first each head/arm assembly (HAA) is individually stacked one atop the other. Then the flanged bearing cartridge 56 is fitted through a bore 106 in each raised hub spacer ring 102. Then the three long screws 58 are inserted through clearance holes 31 in the spacer ring pads 104, and thread into tapped holes 60 in the flange 62 of the bearing cartridge 56 to thereby clamp the arm stack together. Stack clamping forces are imposed only through the very precisely machined arm hub pads 104, thereby minimizing arm distortions. To satisfy the maximum actuator height requirement of 18 mm, screws 58 are flat head clamping screws. More conventional clamping schemes such as a heat shrink ring or a retaining ring in combination with spring washers are not accommodated by the space restrictions of disk drive 10.

When the arms 32 are made from aluminum, then aluminum also is the preferred material for the bearing cartridge hub 56. When the arms 32 are made of a ceramic material, then a steel bearing cartridge hub would be preferred; however, attempting to match coefficients of thermal expansion to minimize creep may not be advantageous for this arrangement. Since all the arms 32 mate only with one another except for the top side of the top arm 32, then any creep of the top arm relative to the cartridge flange 62 should not result in any creep between arms in the stack, because the bottom arm 32 is not rotationally restricted. However, it is always good practice to attempt to mate critical elements with other elements having the same coefficients of thermal expansion.

In brief summary, stacked arm, comb assembly 34 provides nine individually replaceable data arms 32 with integral spacer rings 102. The nine arms 32 carry sixteen low profile HSA's 30. The integral spacer rings 102 provide 3-point clamping and are clamped together to form an integral arm stack 34 having an overall height less than 18 mm. Arms 32 are stacked at pitch of 2 mm to accommodate a disk spacing of 1.365 mm. The flanged bearing cartridge 56 is supported from both ends and the arm stack is not rotationally restricted from moving infinitesimally as a single unit. Electrical connections are made between the recording heads and the flexible cable interconnect 54 carried on both sides of the arm 32.

Figures 11, 12, 13, 14:
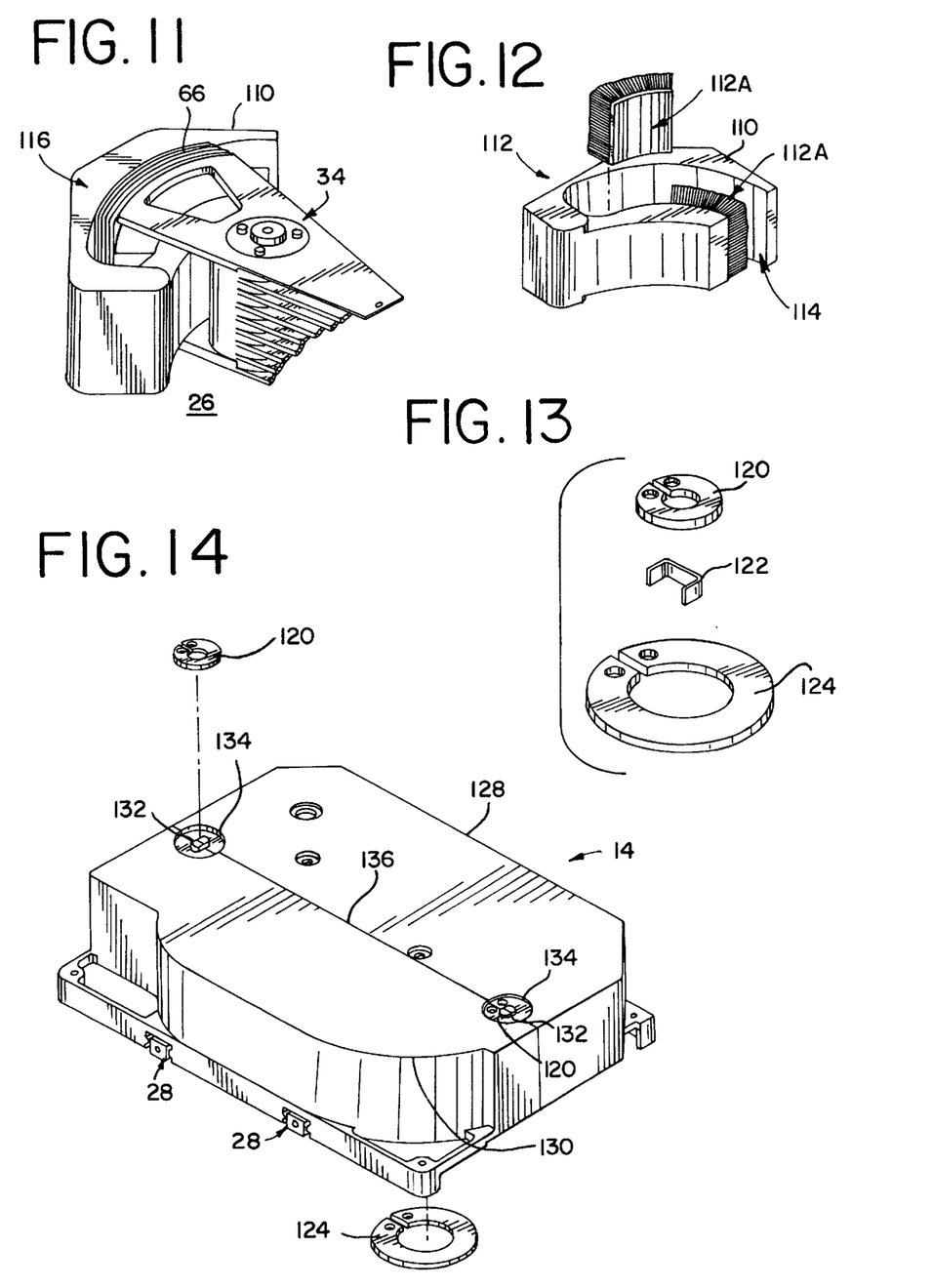
FIG. 11 is a fragmentary perspective view illustrating a curved, vertical voice coil motor (VCM) of an actuator comb assembly of the low profile disk drive of FIG. 1.
FIG. 12 is a fragmentary perspective view illustrating a magnet assembly with a magnet arc removed from the actuator comb assembly of FIG. 10.
FIG. 13 is an exploded perspective view illustrating retaining clips and a spindle spring for assembling a base, a cover and a spindle shaft of the low profile disk drive of FIG. 1.
FIG. 14 is a perspective view illustrating a partially assembled base and cover together with a separately illustrated top retaining clip and bottom retaining clips of FIG. 13.

Referring to FIGS. 11 and 12, there is shown the VCM of the actuator assembly 26 providing sufficient torque to the stacked arm, comb assembly 34 to provide an average access time of less than 7 ms. The vertical coil VCM has a torque constant of approximately 30 Newton—mm/A, and achieve the desired access time when provided with about 2 amps of peak current and proper servo control. FIG. 11 illustrates the curved, vertical coil 66 and a yoke of VCM. FIG. 12 shows a magnet assembly 112 with one of the magnet arcs 112A removed.

A corner space 109 about 17 mm high and 17 mm deep curved partly around the actuator comb assembly within the head/disk assembly (HDA) enclosure 14 fixedly positions a yoke 110 of the VCM. The VCM includes the vertical coil 66 that is rigidly attached to the stacked arm comb 34 and a permanent magnet assembly 112 that is rigidly attached within the file enclosure. The curved, vertical coil 66 is preferred as compared to a flat coil having the same magnetic volume because all the torque producing wire is at the same maximum radius, and thereby provides more torque than an equivalent flat coil. Coil 66 is curved to provide efficient use of the working gap within the magnet assembly 112 and its effective torque radius is 21 mm. The coil 66 is formed from many turns of insulated copper wire bonded together and conforms to the mating curved gap within the magnet assembly. A 30 gauge, 119 turn, 2.2 ohm coil that has an overall height of 16.8 mm can be used for vertical coil 66.

Two very high energy permanent, oppositely polarized magnets 112A produce the magnetic field that interacts with current induced in the coil 66 to provide sufficiently high torque to the comb assembly to accomplish a very fast actuator access time. Two neodymium-iron-boron permanent magnets 112A with an energy product of 35 MGO can be used to provide a gap flux density of approximately 6 K gauss. Magnets 112A are 5.5 mm thick and are polarized oppositely to effect a closed loop magnetic field across the two gaps. One end 114 of the yoke 110 is open so that at file assembly the coil can be merged into the preassembled yoke by simply rotating the actuator comb assembly about its pivotal shaft. An outer structure 116 of the yoke 110 forms a right angle and fits into the inside corner 109 of the HDA enclosure 14. The outer structure or return path member 116 is higher 16 mm than the inner part of the yoke to which the magnets 112A are attached and therefore is thinner, which in turn provides more space for thicker magnets.

Referring to FIGS. 13–16, there are shown retaining clips for the HDA enclosure 14. FIG. 13 shows one of a pair of top retainers 120, a spindle spring 122 and a bottom retainer 124. FIG. 14 shows the two piece enclosure 14 referred to as a clam shell structure, parts lengthwise approximately in the middle, thereby forming a base 128 and a cover 130. To hold the base 128 and cover 130 together, the top retainer 120 is used twice and the bottom retainer 124 used once, providing a three point attachment. The larger of the two pieces forms the base and the smaller of the two enclosure parts serves as the cover. The magnet assembly 112, the comb assembly 34 and the spindle assembly 12 are inserted and attached to the base. Advantages of the clam shell type of enclosure 14 are that the magnet assembly and both ends of the actuator shaft and the spindle shaft are supported within the same structural member, which is very important for thermal stability between the actuator and spindle. Enclosure 14 provides considerable access to the actuator assembly 26 and disks 18 to facilitate head-to-disk merge at time of assembly. Since the merge clearance for disk drive 10 is unusually small, accessibility is a very important factor. Also, enclosure 14 is structurally very stiff, which is an important factor to accomplish very high density recording.

The top retainers 120 and bottom retainer 124 are designed to be spread apart and slip down over an associated split post 132 positioned half on base, half on cover. The area 134 around the post 132 is recessed to allow retainers 120 and 124, when in place, to be flush with the outer surfaces of the base 128 and cover 130. A conductive copper tape 148 is applied over the seam 136 and retainers 120, 124 to provide an air-tight seal for the HDA enclosure 14.

The three retainers 120 and 124 are arranged to provide as constant a load as possible over the maximum range of assembly tolerances. The retainers 120 and 124 are made of a highly ductile high strength stainless steel and designed to deform plastically during assembly. The ductility of the material is used to advantage in that the load/deflection curve for the retainer flattens out at large ID deflections. This flat portion on the load/deflection curve accounts for the somewhat constant load applied by the retainer over a large range of tolerances.

Figure 15:
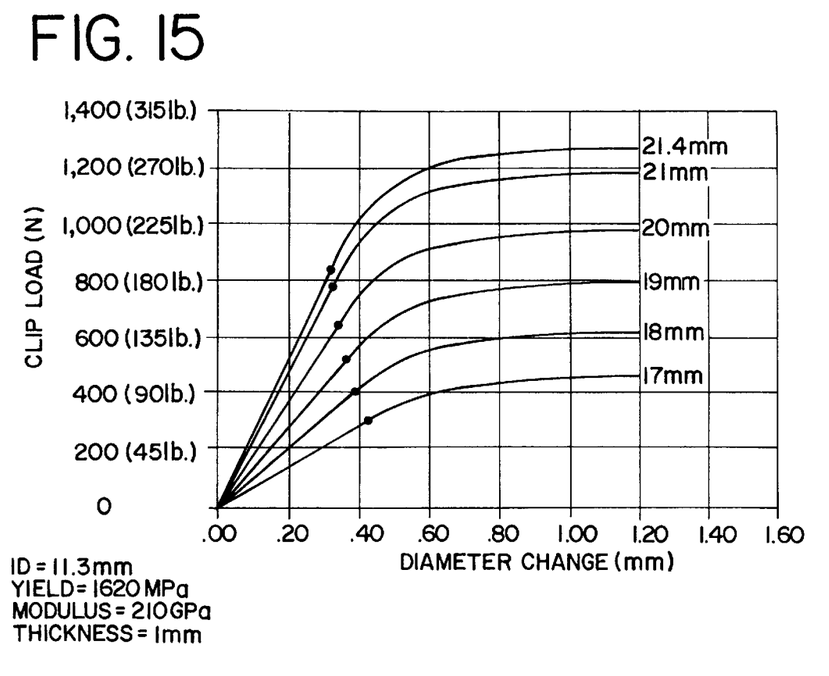
FIG. 15 is a chart illustrating load deflection curves for various values of the outside diameter (OD) with a constant value of the inside diameter (ID) of the bottom retaining clip of FIG. 13.

FIG. 15 shows the load deflection curve for the large retainer 124 for various values of the OD of the retainer with constant values for the ID. The dot along each curve shows where yielding first begins. By allowing the retainers to deform plastically, the flatter portions of the curve govern the loads applied by the retainer. For a range of opening tolerances sufficiently wide to allow easy assembly, the load can be controlled within acceptable bounds. This is not possible with a retainer that remains elastic during assembly.

Figure 16:
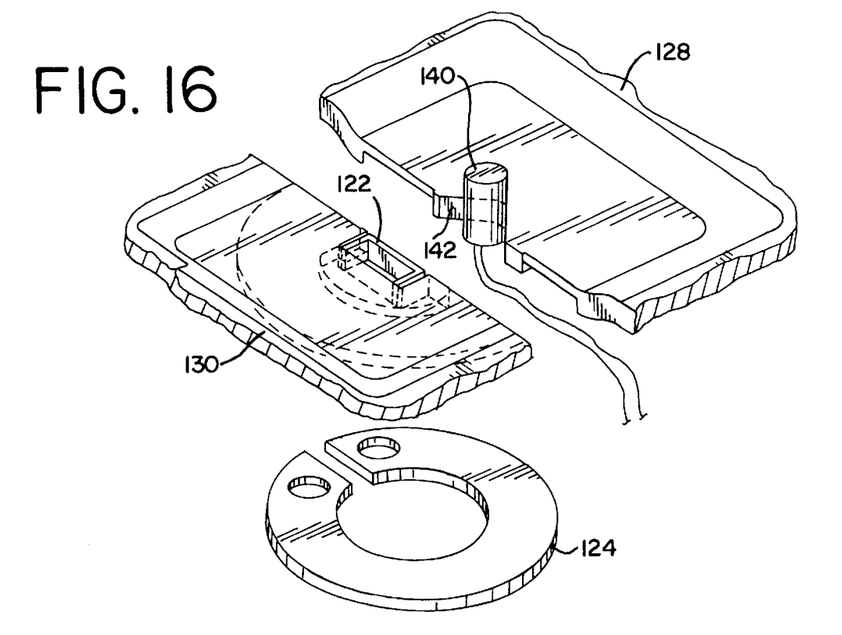
FIG. 16 is a fragmentary perspective view illustrating the spindle spring and the bottom retaining clip of FIG. 13 assembling the spindle shaft with the base and cover.

Referring to FIG. 16, the bottom of the spindle motor shaft 140 is held between a v-groove 142 on the base 128 and the deformable spring clip member 122 attached to the cover 130. Spring clip 122 can be of a high performance material, for example the same stainless steel used for the cover retainers 120 and 124.

When properly positioned within the base 128, the shafts of the comb and spindle are attached at both ends to the base casting. Both halves 128 and 130 are held together by three spring clips 120, 124 shown in FIG. 1. Contact at just three points thereby eliminates distortions that the cover may otherwise impart to the base. Sealing of the enclosure to prevent contamination from entering the file is accomplished by wrapping a strip of copper tape 148 lengthwise around and over the joint between the base 128 and cover 130 as shown in FIG. 20.

Figure 17:
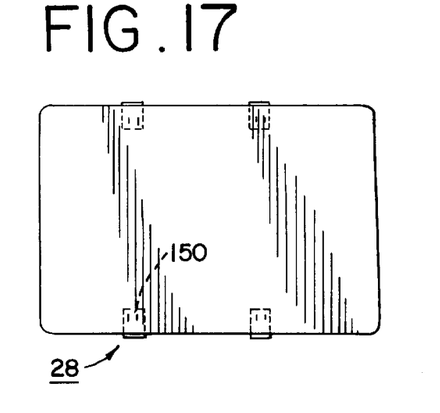
FIG. 17 is a top plan view of an assembled base and cover enclosure illustrating in dotted lines an electrical and mechanical shock isolation arrangement of the low profile disk drive of FIG. 1.
Figure 18:
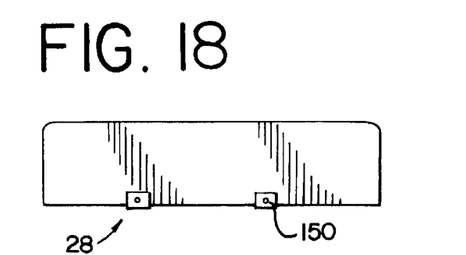
FIG. 18 is a side view of the enclosure and isolation arrangement of FIG. 17.
Figure 19:
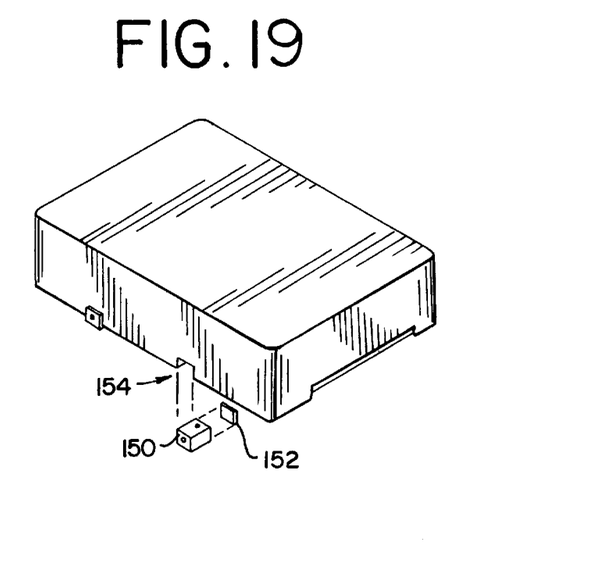
FIG. 19 is a perspective view of the enclosure and isolation arrangement of FIG. 17 with a mounting block and an isolation pad shown removed.

FIGS. 17–19 illustrate the arrangement 28 for providing electrical and shock isolation between the HDA enclosure 14 and the using system box without the use of a conventional user frame and conventional vibration isolators. Disk drive 10 uses MR heads and, therefore, electrical isolation is required between the HDA enclosure 14 and the user box. Because file 10 has an extremely high recording track density, some degree of shock isolation must be provided.

Four individual, but identical, mounting blocks 150 are fitted to a HDA. An energy absorbing, highly damped, resilient material or pad 152 is attached to each of the four sides of each mount block 150. When in place, the mount blocks extend slightly beyond the sides and bottom of the HDA enclosure as illustrated in FIG. 18. Pockets or recesses 154 are provided in the skirt that extends toward the bottom of the HDA to receive the four mounting block assemblies. At assembly, each block 150 is positioned within its respective pocket 154. Thereby, the blocks recessed into the pockets provide shock and electrical isolation, via the pads 152 of the HDA enclosure 14 to the using system's frame.

Figure 20:
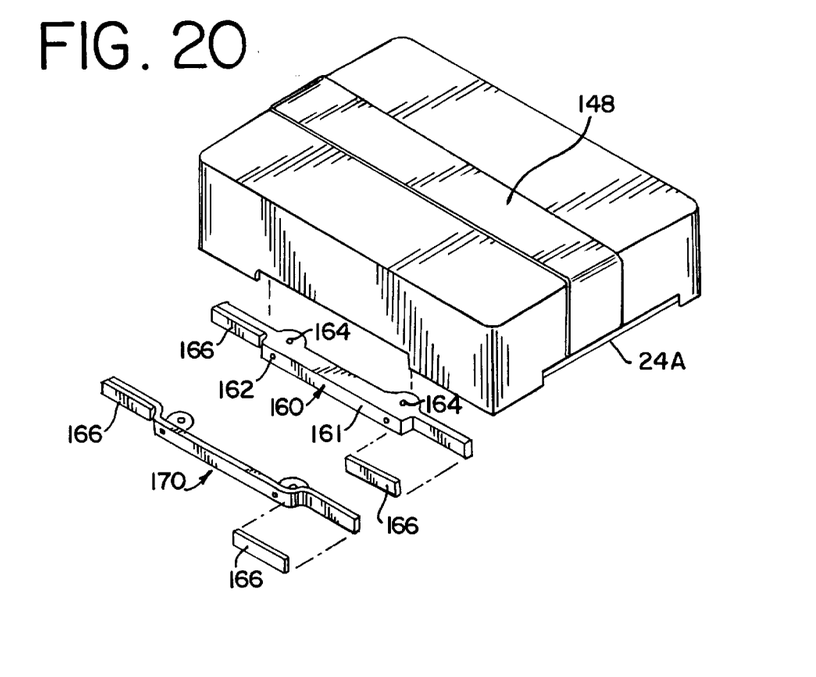
FIG. 20 is an exploded perspective view of an alternative head disk assembly enclosure illustrating alternative first and second abbreviated user frames for the low profile disk drive of FIG. 1.

FIG. 20 illustrates two alternates for the shock and electrical isolation arrangement 28 and the 2½" disk drive 10 with the electronics largely packaged on a single printed circuit card 24 fitted to the bottom side of the drive. The sides of the HDA enclosure 14 extend downward beyond the bottom of the casting to skirt around the electronics card. Openings are provided in the skirt to expose the circuit card edge connector 24A and to accept a pair of abbreviated user frames one on each side of the HDA enclosure 14.

A first abbreviated user frame generally designated 160 consists of a die-cast bar 161 that is provided with two threaded holes 162 for side attachment and two threaded holes 164 for bottom attachment. Energy absorbing, highly damped, resilient strips or pads 166 are attached to the die-cast bar 161 near each end. At assembly, user frame 160 is positioned within the side opening provided in the HDA skirt and the pads are bonded to the inside of the overhanging skirt. Sufficient clearance is provided between the user frame 160 and the skirt opening so that small relative motions can be accommodated between the bar and the HDA. Also, the bar is positioned so that the side and bottom mounting surfaces extend slightly beyond the HDA enclosure, therefore assuring that contact will not occur between the HDA and the using system box.

A second abbreviated user frame generally designated 170, similar to the first abbreviated user frame 160, is fabricated from a sheet metal stamping with the attachment holes formed by pierce and extrude techniques. Tabs are formed at right angles to the side mounting surfaces to accommodate bottom mounting.

While the invention has been described with reference to details of the illustrated embodiments, these details are not intended to limit the scope of the invention as defined in the appended claims.

We claim:

1. A data storage disk drive comprising:
a plurality of disk surfaces mounted in parallel for simultaneous rotation about an-axis;
a plurality of data transducer heads for reading and/or writing data to said disk surfaces; each data transducer head attached to a slider and disposed adjacent a respective one of said disk surfaces;
an actuator for moving said data transducer heads in a radial direction across said disk surfaces; said actuator including;
a series of supporting arms;
at least one suspension load beam attached to each said supporting arm; said suspension load beam connecting said supporting arm to said slider; said suspension load beam including a load dimple bearing in direct engagement with said slider and having opposed stiffening flanges extending toward said respective disk surface in a plane adjacent said slider; and
a flexible cable interconnect attached to said suspension load beam and coupled to said data transducer head, said load dimple extending through said flexible cable interconnect, said flexible cable interconnect defining at least one flexure element for positioning said slider in a flying plane relative to said disk surface and providing slider gimbaling function, whereby a separate flexure element is eliminated.

2. A data storage disk drive as recited in claim 1 wherein said suspension load beam is adhesively bonded to said supporting arm, said suspension load beam and said supporting arm having at least one glue dam feature to divert adhesive.

3. A data storage disk drive as recited in claim 1 wherein said suspension load beam includes a nose portion extending outwardly past said slider and said flexible cable interconnect.

4. A data storage disk drive as recited in claim 1 wherein said flexible cable interconnect is adhesively bonded to said suspension load beam, said flexible cable interconnect and said suspension load beam having at least one aligned aperture to facilitate cleaning said actuator.

5. A data storage disk drive as recited in claim 1 wherein said supporting arm includes an opening for reducing rotational inertia of said supporting arm, and said flexible cable interconnect being carried on said supporting arm spaced from said opening.

6. A data storage disk drive as recited in claim 1 wherein said series of supporting arms are arranged in a stack on a flanged bearing cartridge and said actuator includes means for clamping said stack of supporting arms and wherein said supporting arm includes at least one integral spacer ring, each said at least one integral spacer ring operatively arranged for providing arm parallelism for said series of supporting arms and minimum stackup tolerances for said series of supporting arms, whereby separate spacer rings are eliminated.

7. A data storage disk drive as recited in claim 6 wherein said integral spacer ring includes three pads defining a plane, said three pads operatively arranged for minimizing arm clamping distortion.

8. A data storage disk drive as recited in claim 1 wherein said plurality of transducer heads are magneto-resistive (MR) transducer heads and said flexible cable interconnect being ultrasonically bonded to said MR transducer head.

9. A data storage disk drive as recited in claim 1 wherein said supporting arm is formed of an aluminum material.

10. A low profile data recording disk file of the type having a plurality of magnetic disks providing parallel data disk surfaces mounted for rotation about a common axis comprising:
a stack of head arm suspension assemblies; each of said head arm suspension assemblies including a supporting arm and at least one suspension load beam attached to said supporting arm;
a stack of magnetic disks including a top data disk surface and a bottom data disk surface, and a series of sequential central data disk surfaces;
a top one of said arm suspension assemblies positioning a single slider and a bottom one of said arm suspension assemblies positioning a single slider;
each of a remaining central head arm suspension assemblies including a pair of back-to-back sliders between sequential central data disk surfaces; each of said single sliders and said back-to-back sliders being attached to a flexible signal cable and a load dimple formed in said suspension load beam extending through said flexible signal cable and bearing on each slider;
each of said remaining central head arm suspension assemblies including a pair of integral spacer rings on opposed sides of said supporting arm; and
said top one of said arm suspension assemblies and said bottom one of said arm suspension assemblies including an integral spacer ring on a side of said supporting arm adjacent a central head arm suspension assembly, each said integral spacer ring being operatively arranged for providing arm parallelism with minimum stackup tolerances for said stack of head arm suspension assemblies, whereby separate spacer rings are eliminated.

11. An actuator for use in a data recording disk file as recited in claim 10 wherein said back-to-back sliders are positioned between adjacent disk surfaces having an interdisk spacing of less than 1.4 mm.

12. An actuator for use in a data recording disk file as recited in claim 11 wherein said interdisk spacing equals 1.365 mm.

13. An actuator for use in a data recording disk file as recited in claim 10 wherein at least one of said head arm suspension assemblies includes an extension for operative engagement with a voice coil motor.

14. An actuator for use in a data recording disk file as recited in claim 13 wherein said voice coil rotor includes a curved vertical coil being selectively positioned spaced apart from a pivot of said actuator to maximize torque.

15. An apparatus for storing data on a rotating magnetic media comprising:
a housing having a predetermined height dimension;
a stack of disks contained in said housing and mounted in parallel for simultaneous rotation about an axis; each disk having opposed disk surfaces;
an actuator stack of arm assemblies contained in said housing, each of said arm assemblies including;
a supporting arm;
at least one suspension load beam attached to said supporting arm; each said suspension load beam connecting said supporting arm to a slider and each said slider disposed adjacent a respective one of said disk surfaces in said stack of disks; said suspension load beam including a load dimple bearing in direct engagement with said slider and having opposed stiffening flanges extending toward said disk surface in a plane adjacent said slider;

said housing being formed by a first and a second structural members, said actuator stack and said stack of disks being supported in said first structural member and at least two spring clips attaching said first and second structural members together.

16. An apparatus for storing data on a rotating magnetic media as recited in claim 15 further includes a stack of disks having an interdisk spacing of 1.365 mm.

17. An apparatus for storing data on a rotating magnetic media as recited in claim 16 wherein said stack of disks has a height dimension of 14.635 mm.

18. An apparatus for storing data on a rotating magnetic media as recited in claim 15 wherein said housing includes a base and cover and both said base and cover including walls having a thickness of 1.5 mm.

19. An apparatus for storing data on a rotating magnetic media as recited in claim 18 wherein clips are used to hold said base and said cover together.

20. An apparatus for storing data on a rotating magnetic media as recited in claim 15 further includes a planar electronics circuit card attached to said housing and said card has a thickness of 0.8 mm.

21. An apparatus for storing data on a rotating magnetic media as recited in claim 20 wherein said planar electronics circuit card is populated with components having a height no larger than 2 mm.

22. An apparatus for storing data on a rotating magnetic media as recited in claim 15 wherein said housing is formed by a base and a cover and further includes a plurality of mounting blocks being received in recesses formed in said base and cover.

23. An apparatus for storing data on a rotating magnetic media as recited in claim 22 further includes a plurality of shock isolation pads coupled between said housing and each said mounting block.

24. An apparatus for storing data on a rotating magnetic media as recited in claim 23 wherein said shock isolation pad electrically isolates said housing and each said mounting block.

* * * * *